United States Patent [19]

Dey

[11] 4,088,355
[45] May 9, 1978

[54] QUICK-ACTING FASTENER ASSEMBLY

[75] Inventor: Ervin J. Dey, Santa Fe Springs, Calif.

[73] Assignee: Standard Pressed Steel Co., Jenkintown, Pa.

[21] Appl. No.: 783,534

[22] Filed: Apr. 1, 1977

[51] Int. Cl.² ............................................... E05C 5/04
[52] U.S. Cl. ..................................... 292/251; 85/1 R
[58] Field of Search ..................... 292/111, 106, 251.5, 292/58; 85/1, 32

[56] References Cited

U.S. PATENT DOCUMENTS

| 1,664,820 | 4/1928 | Hughes | 292/251 |
| 3,847,422 | 11/1974 | Gulistan | 292/251 |

FOREIGN PATENT DOCUMENTS

| 576,413 | 5/1924 | France | 292/58 |

Primary Examiner—Richard E. Moore
Attorney, Agent, or Firm—Andrew L. Ney; Aaron Nerenberg

[57] ABSTRACT

A quick-acting fastener assembly for securing a hinged cover to a storage box wherein the components of the fastener assembly are retained on the box and cover respectively when the fastener is not secured. The fastener assembly is self-actuatable without the need for any external tool, and the component parts are not loose and free to rattle in an unsecured position. The assembly includes a hollow stud member which has screw threads at both ends thereof, a securing nut assembly on one end, an adjusting nut assembly on the other end and a spring. The stud member is slidingly mounted through an opening in the box and includes a tab member carried thereon which restricts rotation of the stud relative to the box and also restricts axial movement of the stud in one direction. One end of the stud includes multiple lead threads which cooperate with the securing nut assembly to fasten the cover. The other end of the stud is threaded to cooperate with the adjusting nut assembly which compresses the spring located between the head of the adjusting nut and a member projecting from the box in order to bias the stud member in one direction until the tab member bears against the box. A prevailing torque feature is included between the threads of the stud and the adjusting nut assembly. A handle, pivotable about the axis of the securing nut, rotates the securing nut assembly to engage the multiple lead threads on the stud. When the fastener is fully engaged and the cover is secured to the box, the handle is pivoted to a stowed position within an envelope formed by the extremities of the door and the protruding portion of the stud member and is secured in this position. A detent arrangement in the securing nut assembly retains the handle in the stowed position, aided by a rubber coating on the gripping portion of the handle which provides a friction engagement with the securing nut assembly.

20 Claims, 4 Drawing Figures

U.S. Patent  May 9, 1978  4,088,355
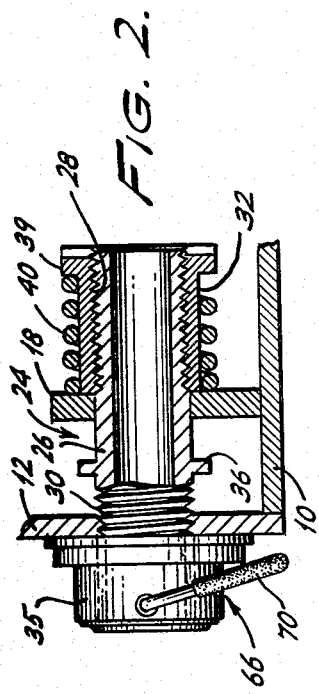
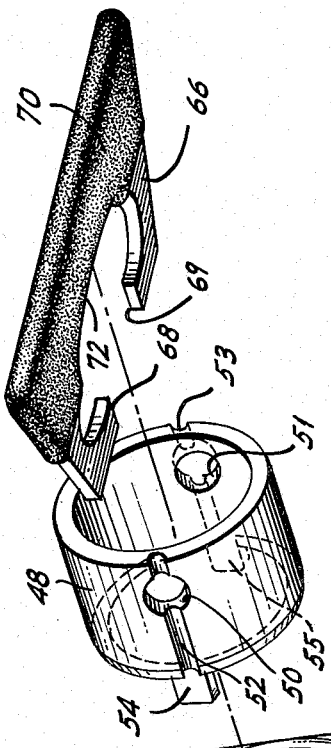
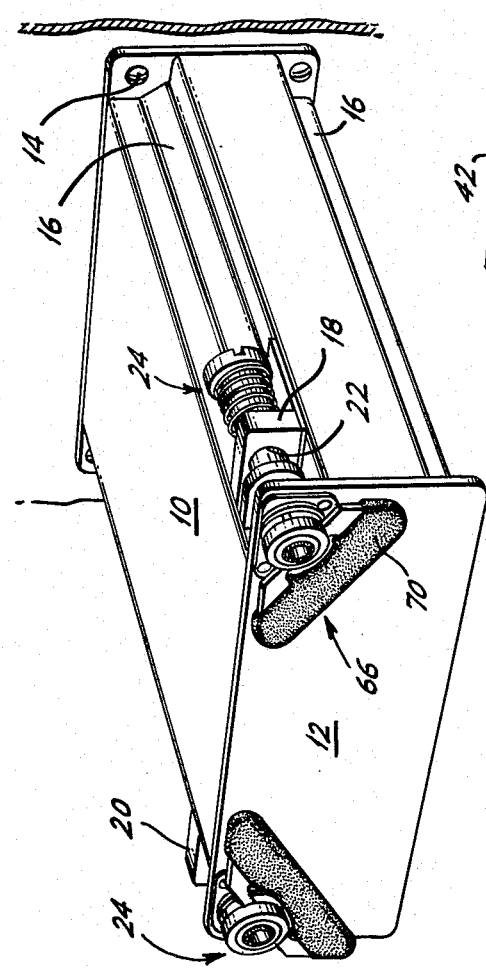
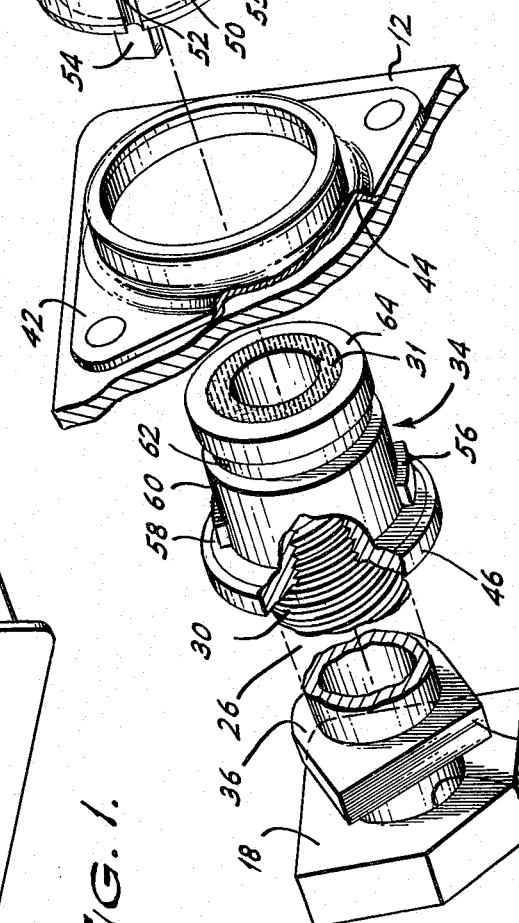

QUICK-ACTING FASTENER ASSEMBLY

BACKGROUND OF THE INVENTION

This invention relates to fasteners and more particularly to a quick-acting fastener assembly for positively securing two members together.

In certain aerospace vehicles contemplated for orbital space flight, such as the Space Shuttle, numerous storage boxes must be included on board the vehicle to deliver various types of cargoes between the earth and an orbiting space station. These storage boxes must include a special type of fastener assembly for securing the cover of the box in a closed position while simultaneously meeting a number of other requirements. Included among these are the requirements that the fastener be self-actuatable without the need for any external tool, that the component parts of the fastener assembly not be loose and capable of rattling in an unsecured position, that there be a visible indication that the fastener is in a secured condition, and that the self-actuatable means used to engage the nut be positively stowed in a position which does not extend beyond the envelope of the door and the extent of the fastener when the cover is secured. The fastener must also include a continuous opening through its axis in order to allow a tool shank to be inserted through its center to secure another fastener at the rear of the box to mount the box to a wall. These and other requirements are met by the present invention.

SUMMARY OF THE INVENTION

It is therefore a general purpose and object of the present invention to provide a quick-acting fastener assembly for securing one member to another member. It is another object of the present invention to provide a quick-acting fastener assembly having components which are not loose and capable of movement in a latched or an unlatched condition. It is still another object of the present invention to provide a quick-acting fastener assembly which is self-actuatable without the use of an external tool. It is yet a further object of the present invention to provide a quick-acting fastener assembly which provides a visible indication of a secured condition and which includes a prevailing torque feature between the securing components of the fastener.

These and other objects are accomplished according to the present invention by a quick-acting fastener assembly for securing first and second members together including securing means rotatingly mounted on the first member, adjustment means, and stud means slidingly mounted in the second member, the stud means including tab means thereon for allowing limited rotation of the stud means and for positively restricting axial movement of the stud means in one direction relative to the second member, the stud means also having means adjacent both ends thereof for cooperating with the securing means and the adjustment means. The securing means engage one end of the stud means to secure the first member to the second member. Biasing means are located between the adjustment means and the second member to eliminate looseness in the fastener assembly in a secured or an unsecured condition.

BRIEF DESCRIPTION OF THE DRAWINGS

FIG. 1 is a perspective view of a storage box mounted on a wall including a pair of fasteners in accordance with the present invention;

FIG. 2 is a side elevation view in partial cross-section showing the elements of the fastener of FIG. 1 and their position relative to the box structure;

FIG. 3 is a side elevation view of the stud shown in FIG. 2; and

FIG. 4 is an exploded perspective view with portions broken away of a portion of the fastener assembly illustrated in FIG. 2.

DESCRIPTION OF A PREFERRED EMBODIMENT

In accordance with a preferred embodiment of the present invention, FIG. 1 shows a box 10 having a cover 12 hinged at the bottom thereof capable of opening outwardly and downwardly to provide access to the interior of the box. Box 10 is mounted to a wall by means of appropriate fasteners (not shown) at mounting holes 14 at the rear of the box. Box 10 also includes cut-outs or channels 16 at all four corners thereof extending along the entire length thereof. Mounted in both upper channels 16 are brackets 18 and 20, each of which include a hole 22 therethrough for mounting a fastener assembly 24 in accordance with the present invention. Fastener assemblies 24 are shown in FIG. 1 in the engaged position securing cover 12 to box 10. As will be more fully discussed hereinafter, the respective handles of fastener assemblies 24 are shown in a fully stowed position within the envelope of cover 12 and fastener assembly 24.

Referring now to FIGS. 2 and 3, fastener assembly 24 is shown in partial cross-section in order to illustrate its construction and its relationship to the fixed members on box 10. Assembly 24 generally includes a stud member 26 having threaded sections 28 and 30 at either end. The end 31 of stud member 26 adjacent threaded section 30 is preferably a visible color, such as yellow, orange or possibly green, for example, for reasons which will be explained hereinafter. Threaded section 28 is generally a conventional thread which is formed to cooperate with mating internal threads on an adjusting nut 32. A self-locking feature is included between the threads in section 28 and on adjusting nut 32. Any one of a number of conventional self-locking features could be utilized. One example of such a feature is the threads illustrated and described in U.S. Pat. No. 3,927,503 to Wilson. The threads in section 30 are multiple lead threads wherein the lead angle is preferably approximately four times the lead angle of a standard thread. The multiple lead threads in section 30 cooperate with a nut member 34 forming one component of a captive nut assembly 35. The mating multiple lead threads allow captive nut assembly 35 to be rotated into engagement with stud 26 in less turns than would be required with a standard thread having a normal lead angle. Stud 26 also carries a member 36 intermediate its ends, which member has an edge 38 designed to fit into channel 16 when the fastener is installed to prevent the assembly from rotating about its axis. A spring 40, preferably a coil spring, is interposed between the enlarged head 39 of adjusting nut 32 and member 18 mounted on box 10, and surrounds the body of adjusting nut 32 when it is threaded onto section 28 of stud 26.

Referring now to FIG. 3, captive nut assembly 35 will be described in greater detail. A retainer plate 42 is mounted on the outside of cover 12 by an appropriate fastening means (not shown). Plate 42 includes an undercut portion 44 into which a flange 46 on nut member 34 fits and is captivated between cover 12 and the plate. Nut member 34 is thus free to rotate freely without restriction between plate 42 and the surface of cover 12. A collar member 48 fits over nut member 34 in sliding engagement therewith and includes holes 50 and 51 on diametrically opposite sides of collar member 48 and axial slots 52 and 53 extending from respective holes 50 and 51 toward both ends of the collar member. Slots 52 and 53 each terminate in respective tabs 54 and 55 which protrude axially from the leading end of collar member 48. When installed over nut member 34, tabs 54 and 55 are free to rotate between stops 56 and 58, which are located diametrically opposite each other on the surface of body portion 60 of nut member 34 adjacent flanged end 46. Collar member 48 is therefore free to rotate within an arc of less than 180° with respect to nut member 34. When installed in this position, holes 50 and 51 are in radial alignment with an annular groove 62 in body portion 60 adjacent the protruding or visible end 64. Collar member 48 is rotatingly retained on nut member 34 by means of a handle 66 having radially inwardly extending ends 68 and 69 which fit through holes 50 and 51, respectively, and contact the inner surface of groove 62 in nut member 34. Ends 68 and 69 must initially be radially outwardly expanded to fit over collar member 48, and thereafter resiliently contract inwardly into groove 62. Handle 66 further includes a coating 70 of a resilient material, such as silicone rubber, over the gripping portion thereof. There are two purposes for resilient material coating 70. First, due to the thickness of the material, the inside surface 72 is designed to frictionally interfere with the outside surface of collar member 48 to a slight degree, assisting in retaining the handle in a stowed position after the fastener assembly is engaged and cover 12 is secured in a closed position on box 10. This can best be seen with regard to FIG. 1, which shows handle 66 in such a stowed position. The second reason for coating 70 concerns the requirement that the fastener must not rattle and must remain quiet at all times, especially in the event that vibrations are encountered.

Holes 50 and 51 and axial slots 52 and 53 act as a detent mechanism with respect to ends 68 and 69 on handle 66. The handle is normally disposed either in an operative position with its plane generally parallel to the axis of the fastener assembly, or in a stowed position with its plane generally perpendicular (or forming a slightly acute angle) to the axis of the fastener assembly. This is caused by the resiliency in the portion of the handle adjacent ends 68 and 69 cooperating with respective grooves 52 and 53. Once the fastener assembly is fully engaged, whereby nut member 34 is fully seated on threaded section 30 of stud 26, handle 66 must be secured with its outer extremities within the envelope formed by the edges of cover 12 and the outermost portion of assembly 24. This is acomplished by rotating handle 66, coupled to collar member 48 and within groove 62, to the position shown in the right-hand portion of FIG. 1. It should be remembered that handle 66 can only rotate within an arc of less than 180° bounded by the travel of tabs 54 and 55 between stops 56 and 58 on nut member 34. Once in the proper position, handle 66 is rotated about its own axis to the stowed position shown in FIG. 1, in which position resilient material 70 frictionally contacts the outside of collar member 48 to help retain the handle in this stowed position.

Prior to use, adjusting nut 32 is engaged on threaded section 28 of stud member 26 compressing spring 40 to take up any looseness between the fastener assembly and member 18 on box 10. In the unassembled condition, spring 40 urges member 36 on stud member 26 against member 18. Adjusting nut 32 also positions stud 26 axially within hole 22 of member 18 exposing the proper amount of multiple lead threads in section 30 in order to allow proper engagement of nut assembly 35 thereon. When the fastener is fully secured with cover 12 completely seated on the end of box 10, colored end 31 of stud member 26 should be visible to an observer in order to show that the box is in a secured condition. FIG. 1 illustrates the stowed position of handle 66 and the visible colored surface 31 of stud member 26.

Having thus described a preferred embodiment of the present invention, some of its many features and advantages should now be evident. The fastener is self-actuating and requires no tool to engage the component parts on the cover and the body of the box. Engagement of the mating threads requires considerably less rotation due to the presence of mating multiple lead threads on the captive nut assembly and the stud. The fastener will not rattle or loosen in the presence of vibration due to the take-up spring and adjusting nut as well as the resilient coating on the fastener handle. A prevailing torque locking feature included between the threads of the stud and the adjusting nut prevents loosening between these two members. The fastener is hollow allowing a tool shank to be placed through the center of the fastener in order to engage a fastener at the rear of the box mounting the box to a wall. Finally, the fastener includes visible indication means for insuring that the fastener is in a secured condition.

While in the foregoing there has been disclosed a preferred embodiment of a quick-acting fastener assembly in accordance with the present invention, various changes and modifications should be readily apparent to one skilled in the art and are within the intended scope of the invention as recited in the claims.

We claim:

1. A quick acting fastener assembly for securing a first member to a second member the assembly comprising:
    securing means rotatingly mounted on the first member;
    adjustment means;
    stud means mounted on the second member, including means carried thereon for allowing limited rotation of said stud means about its axis and for positively restricting axial movement of said stud means in one direction relative to the second member, said stud means having adjacent both ends thereof means for cooperating with said securing means and said adjustment means to allow relative axial movement therebetween; and
    biasing means operatively disposed between the second member and said adjustment means for biasing said stud means to an axial position wherein said rotation limiting means bears upon the second member restricting further axial movement in said one direction when said securing means is disengaged from said stud means;
    whereby said securing means is adapted to engage one end of said stud means to secure the first member to the second member and whereby in the secured position said adjustment means bears upon the second member to limit axial movement of the stud means in the other direction.

2. A quick acting fastener in accordance with claim 1 wherein said means for cooperating with said securing means and said adjustment means adjacent both ends of said stud means are external screw threads, and wherein said securing means and said adjustment means are internally threaded nuts.

3. A quick acting fastener in accordance with claim 1 wherein said securing means includes handle means thereon for rotating said securing means.

4. A quick acting fastener in accordance with claim 3 wherein said handle means includes means for stowing said handle means in a position wherein the outermost extent of said handle means is within an envelope bounded substantially by the outermost extent of the first member and said securing means.

5. A quick acting fastener in accordance with claim 4 wherein said handle means is pivotable about its axis and can rotate around its axis in the stowed position within an arc of less than 180° without rotating said securing means.

6. A quick acting fastener in accordance with claim 5 wherein said means adjacent said one end of said stud means is an external screw thread and wherein said securing means comprises an internally threaded member including an enlarged head at one end thereof and a shank portion extending in an axial direction from said enlarged head, said shank portion including stop members spaced approximately 180° from each other adjacent said enlarged head and groove means intermediate the ends of said shank portion, a collar member operatively retained for rotation on said shank portion, said collar member including tabs cooperating with said stop members for limiting the extent of rotation of said collar member relative to said shank portion to an arc of less than 180°, and said handle means includes a handle operatively attached to said collar member and cooperating with said groove means, whereby said handle is operative to rotate said collar member.

7. A quick acting fastener in accordance with claim 1 wherein said stud means includes visual indication means for indicating the engaged position of the fastener assembly.

8. A quick acting fastener in accordance with claim 7 wherein said securing means is open at both ends thereof and said visual indication means comprises a colored surface visible on said one end of said stud means when the securing means is engaged on said stud means.

9. A quick acting fastener in accordance with claim 2 wherein said external screw threads adjacent said one end of said stud means are formed with a multiple lead and said internal threads in said securing nut are formed with cooperating multiple lead threads.

10. A quick acting fastener in accordance with claim 1 wherein a prevailing torque locking feature is included between said adjustment means and said stud means.

11. A quick acting fastener in accordance with claim 2 wherein a prevailing torque locking feature is provided between mating threads on said adjustment nut and said stud means.

12. A quick acting fastener in accordance with claim 1 wherein said biasing means is a coil spring.

13. A quick acting fastener in accordance with claim 1 wherein the stud means includes an opening through the entire length thereof.

14. A nut assembly comprising:
a collar member;
actuating means; and
an internally threaded member including a shank portion having means thereon for limiting rotational movement of said collar member with respect to said internally threaded member and groove means intermediate the ends of said shank portion, said collar member being carried on said shank portion and having openings therein registering with said groove means in said shank portion, and said actuating means cooperating with said openings and said groove means;
whereby upon rotation of said actuating means greater than a predetermined angular arc, said internally threaded member is rotated.

15. A nut assembly in accordance with claim 14 wherein said means for limiting rotation associated with said internally threaded member includes stop members adjacent one end of said shank portion spaced approximately 180° from each other, and said collar member including tabs cooperating with said stop members for limiting the extent of rotation of said collar member relative to said shank portion to an arc of less than 180°.

16. A nut assembly in accordance with claim 14 wherein said groove means is an annular groove.

17. A nut assembly in accordance with claim 16 wherein said actuating means includes a planar handle having a gripping portion and ends which fit through said opening in said collar member and extend into said groove.

18. A nut assembly in accordance with claim 17 wherein said actuating means gripping portion is coated with a resilient material formed to interfere with and provide a frictional engagement with said collar member in one position of said handle.

19. A nut assembly in accordance with claim 14 wherein said collar member includes axial grooves in the surface thereof intersecting with said openings to provide a detent mechanism for maintaining said actuating means in an operative position.

20. A nut assembly in accordance with claim 14 wherein said internally threaded member includes an enlarged head at said one end of said shank portion for mounting on an external member.

* * * * *